2,745,760

LAUNDRY STARCH

Bud J. Peter, Santa Rosa, Calif., assignor, by mesne assignments, to American Tansul Company, San Francisco, Calif., a corporation of California No Drawing. Application October 15, 1952,
Serial No. 314,940

4 Claims. (Cl. 106—214)

This invention relates to a starch product obtained by the addition of the mineral hectorite to conventional starch.

The invention has particular application in the preparation of starch used for sizing and starching clothing in laundries. In accordance with conventional practice, commercial laundries prepare a mixture of starch and water which is boiled in a steam jacketed or otherwise heated kettle for a sufficient period of time until the starch is dissolved and thickened. The starch is generally added to clothing during the final rinse or, in some cases, a thinned starch base is prepared and the garments are dipped into such a base. Such starch pastes are also sometimes used without thinning and the garments or clothing are dipped in such a paste mixture and hung to dry and when the clothing is ironed or pressed, the garments are dampened to thin the starch.

One of the difficulties encountered in commercial laundering is that the iron or press adheres to the starched surface of the fabric and has to be removed by forceful pulling of the garment, which sometimes causes damage. In accordance with the present invention a mineral substance hereinafter described in detail is added with the starch when the original paste is made up. This results in a smoother starch. Further, when clothing is pressed it is found that it does not tend to stick to the hot metallic surface of the press or iron. When clothing consisting of several layers of fabric are starched, in accordance with the present invention, the layers of fabric do not stick together, whereas in ordinary starched clothing the multiple layers of fabric quite frequently adhere to one another. Thus clothing starched with this invention presents a smooth surface and increased flexibility which is particularly noticeable on such items as shirt collars and cuffs where the body and feel of the fabric is enhanced.

Another advantage of this invention is a material reduction in the amount of starch required to prepare a paste of the proper body. By adding a small quantity of the mineral substance, a paste can be prepared using a lesser quantity of starch than is required to prepare a corresponding paste without addition of the mineral substance. No additional boiling or other treatment is required to produce a satisfactory result.

Still another advantage of the invention is that finished garments which are treated with starch prepared in accordance with this invention hold their stiffness for a longer period of time even under humid conditions.

Still another advantage of the invention is that when a starch formula is prepared in accordance with this invention and an unused portion thereof is allowed to stand and cool, the starch can be reheated and used and it is found that it does not form a scum such as is the case with other types of starch which are not similarly treated.

The present invention can also be applied to cold water sizing and starching as an extender, filler and lubricating agent.

Other objects and advantages of the present invention are that less starch is used to gain the desired thickness in the solution, no oil or wax need be incorporated into the mix, less expensive grades of starch may be used, and fabrics which cannot at present be starched with conventional mixtures can now be treated. In addition, the stiffness of the fabric endures longer, layers of cloth do not adhere to each other and flat pieces may be ironed without sticking to the iron without using a leader. Labor in the laundry is reduced, and an improved gloss is achieved.

As has been stated, the present invention relates to the addition of a mineral substance to starch. This mineral is hectorite and more particularly that variety thereof which occurs naturally in the vicinity of Daggett, California. This mineral has approximately the following chemical composition:

|  | Per cent |
|---|---|
| Silica ($SiO_2$) | 53.68 |
| Alumina ($Al_2O_3$) | .60 |
| Lime (CaO) | .52 |
| Magnesia (MgO) | 25.34 |
| Sodium oxide ($Na_2O$) | 3.00 |
| Potassium oxide ($K_2O$) | .07 |
| Water ($H_2O$) | 15.52 |
| Chlorine (Cl) | .31 |
| Lithium (Li) | [1] 1.00 |

[1] Approximately.

The mineral hectorite is a natural hydrophilic hydrated magnesium silicate. The invention utilizes the film-forming, lubricating and thickening properties of this mineral, which are not secured by employing other clays such as Wyoming bentonites. Further, ordinary bentonites contain so much impurity that they are not satisfactory from a practical standpoint since they discolor the fabrics starched. The mineral which has been heretofore described is white and completely dispersible and hence has vastly improved properties over related clays. In one preferred starch formula, the mineral hectorite is added to commercial laundry starch prior to cooking in the proportion of 1 lb. powdered hectorite, 2 lbs. starch and 10 gals. of water. This mixture is then heated in a steam jacketed kettle or the like until the starch is dissolved and thickened to the desired consistency. The hectorite not only gelatinizes the starch but also extends the starch in that approximately a 50% reduction in the quantity of starch required to produce a paste of the desired consistency is accomplished. Further, when the starch is used it prevent sticking to irons or presses.

Other formulas may be employed. Thus, for example, 1 lb. of powdered hectorite and 6 lbs. of starch may be mixed to accomplish the same results as formerly accomplished with 8 lbs. of commercial starch.

In general, the mineral hectorite may be used to replace about one-fifth of the total starch used in preparing laundry size. One-half pound of hectorite may be used in place of 1½ lbs. of starch omitted.

While I have described my invention in considerable detail by way of illustration and example for purposes of facile understanding, it is understood that changes and modifications in formula and practice may be made within the spirit of the invention and scope of the appended claims.

What is claimed is:

1. A laundry product comprising laundry starch, flaked hectorite and water.

2. A laundry product comprising laundry starch, flaked hectorite and water in the proportions of 1 lb. hectorite, 2 lbs. starch and 10 gals. water.

3. A laundry product comprising hectorite, laundry starch and water in the proportions of about 1 lb. hectorite, 6 lbs. starch and approximately 10 gals. water to form a paste of the desired consistency.

4. A laundry product comprising laundry starch, hectorite and water in the proportions of 1 lb. hectorite, 2 lbs. starch and sufficient water to form a paste of the desired consistency.

References Cited in the file of this patent

UNITED STATES PATENTS

| | | |
|---|---|---|
| 341,576 | Hollen | May 11, 1886 |
| 652,638 | Potter | June 26, 1900 |
| 1,077,131 | English | Oct. 28, 1913 |
| 1,498,269 | Harris | June 17, 1924 |
| 1,863,731 | Schorger | June 21, 1932 |
| 2,212,557 | Bauer | Aug. 27, 1940 |
| 2,235,676 | Gardner | Mar. 18, 1941 |

FOREIGN PATENTS

| | | |
|---|---|---|
| 3,459 | Great Britain | of 1868 |